(12) United States Patent
Kweeder et al.

(10) Patent No.: US 7,175,684 B1
(45) Date of Patent: Feb. 13, 2007

(54) PRILLING METHOD

(75) Inventors: James A. Kweeder, Chester, VA (US); Arthur Ray Shirley, Jr., Florence, AL (US); Keith D. Cochran, Killen, AL (US); Timothy G. Holt, Florence, AL (US)

(73) Assignee: Honeywell International, Inc.

( * ) Notice: Subject to any disclaimer, the term of this patent is extended or adjusted under 35 U.S.C. 154(b) by 0 days.

(21) Appl. No.: 09/468,668

(22) Filed: Dec. 21, 1999

Related U.S. Application Data

(60) Provisional application No. 60/146,651, filed on Jul. 30, 1999.

(51) Int. Cl.
  B29B 9/00 (2006.01)
  C05C 1/00 (2006.01)
  C05C 3/00 (2006.01)
  C05C 5/00 (2006.01)
  C05C 11/00 (2006.01)

(52) U.S. Cl. .................. 71/59; 71/60; 71/61; 71/64.01; 71/64.13; 264/8; 264/9

(58) Field of Classification Search .................. 71/59, 71/60, 61, 64.01, 64.03, 64.04, 64.13; 264/5, 264/8, 9, 13, 14, 3.5, 3.6
See application file for complete search history.

(56) References Cited

U.S. PATENT DOCUMENTS

| | | | | |
|---|---|---|---|---|
| 2,510,574 A * | 6/1950 | Greenhalgh | ..................... | 264/9 |
| 2,929,107 A * | 3/1960 | Andrew | ....................... | 264/3.6 |
| 2,979,764 A * | 4/1961 | Andrew | ........................... | 425/6 |
| 3,021,207 A * | 2/1962 | Stengel | | |
| 3,055,049 A * | 8/1962 | De Bruyne et al. | ............. | 71/41 |
| 3,083,406 A * | 4/1963 | Hoogendonk | | |
| 3,214,260 A * | 10/1965 | Yasumaro Oi et al. | ......... | 264/9 |
| 3,317,276 A * | 5/1967 | Brown, Jr. et al. | ......... | 423/267 |
| 3,539,326 A * | 11/1970 | Otsuka et al. | | |
| 3,607,993 A * | 9/1971 | Tuttle | ............................. | 264/8 |
| 3,617,235 A | 11/1971 | Friestad | ............................. | 71/1 |
| 3,649,173 A * | 3/1972 | Falck-Muss et al. | ........ | 423/275 |
| 3,785,796 A | 1/1974 | Mann, Jr. | ....................... | 71/28 |
| 3,820,971 A | 6/1974 | Rounsaville | ................... | 71/35 |
| 3,856,269 A | 12/1974 | Fothergill et al. | ............... | 259/4 |
| 3,952,078 A * | 4/1976 | Bradley | ........................ | 264/13 |
| 3,988,398 A * | 10/1976 | Frenken et al. | ................. | 264/8 |
| 4,076,773 A * | 2/1978 | Mahl, Jr. et al. | ............. | 264/3.5 |
| 4,323,386 A | 4/1982 | Heggebo et al. | ................ | 71/35 |
| 4,486,396 A * | 12/1984 | Kjohl et al. | ................. | 423/265 |
| 4,818,279 A * | 4/1989 | Chaleat et al. | ................ | 75/340 |
| 5,378,259 A * | 1/1995 | Bassetti et al. | ................. | 71/59 |
| 5,382,145 A * | 1/1995 | Harreither | ....................... | 425/8 |
| 5,466,281 A * | 11/1995 | Hanke et al. | ............. | 106/31.38 |
| 6,273,929 B1 * | 8/2001 | Hobbs | ........................ | 71/64.03 |

FOREIGN PATENT DOCUMENTS

| | | | |
|---|---|---|---|
| DE | 2355660 | | 5/1975 |
| GB | 1049782 | * | 11/1966 |
| GB | 1119702 | * | 7/1968 |
| GB | 1481038 | | 7/1977 |
| SE | 70119 | | 1/1929 |

OTHER PUBLICATIONS

Holland et al., Fluid Flow for Chemical Engineers, 1995, Arnold, pp. 52,53, and 55.*
Perry et al., Perry's Chemical Engineers' Handbook, 1997, McGraw-Hill, 7th Edition, p. 6-4.*
http://www.m-w.com/cgi-bin/dictinary, Merriam-Webster Dictionary OnLine, "sufficient".*
http://www.m-w.com/cgi-bin/dictinary, Merriam-Webster Dictionary OnLine, "nominal".*
FAI-IFDC Fertiliser Seminar 1977—Trends in Consumption & Production, "Prilling Compound Fertilisers", The Fertiliser Association of India, Feb. 1978, TECH II, 6-1 to 6-5.
Gordon C. Hicks & John M. Stinson, "Pilot-Plant Production of Urea-Ammonium Sulfate", Ind. Eng. Chem. Process Des. Dev. vol. 14, No. 3, 1975 pp. 269-276.

* cited by examiner

*Primary Examiner*—Arthur L. Corbin
(74) *Attorney, Agent, or Firm*—Sandra P. Thompson; Buchalter Nemer

(57) ABSTRACT

A prilling method comprising the steps of: providing a molten first component, mixing at least a second component with the molten first component, reacting the components to form a shear-thinnable mixture; and prilling the shear-thinnable mixture wherein the prilling comprises mechanically agitating in the prill head to shear thin the shear-thinnable mixture sufficiently to permit prilling. The inventive method can be used to produce fertilizer product comprising ammonium sulfate nitrate.

13 Claims, 4 Drawing Sheets

PRILLING METHOD

RELATED APPLICATIONS

This application claims the priority date of pending provisional application No. 60/146,651, filed Jul. 30, 1999.

BACKGROUND OF THE INVENTION

1. Field of the Invention

This invention relates to a method of prilling. More particularly, it relates to a method of prilling a shear-thinnable mixture of a meltable first component and a second component using mechanical agitation in a prill head to shear thin the mixture.

2. Brief Description of Related Art

Production of mixed fertilizer products such as NPK (nitrogen, phosphorous, potassium) has been typically accomplished by agglomerating basic fertilizer products (potash, urea, etc.) in drum and pan granulation equipment to yield fertilizer particles of desired size and nutrition analysis. Fertilizers for turf and specialty applications are still made in this manner, however, most agricultural customers have moved to simple, blended fertilizers where the basic NPK components are merely mixed together without any attempt to join the particles. While blended fertilizers do not have homogeneous particles with identical NPK content, elimination of the agglomeration step results in reduced manufacturing cost. Uniform spreading of a fertilizer blend, however, is more difficult owing to the differing sizes and weights of the individual basic fertilizer particles used to make the blend.

Mixed, agglomerated fertilizer products can have other benefits besides easier spreading. Micronutrients (trace mineral compounds) can be incorporated into the fertilizer. Because micronutrients are used in minute amounts (less than 1%), it is not practical to blend in these compounds and achieve a uniform spread as the finely ground micronutrient will segregate in the spreading equipment. Another advantage of homogeneous fertilizer is that the properties of the product (such as resistance to humidity in storage) can be controlled by selection of ingredients.

It would be desirable to produce a mixed fertilizer without the added step of a separate agglomeration. The difficulty in accomplishing this goal is that the different basic fertilizers have differing and generally incompatible manufacturing processes. Many fertilizers (e.g.: potash, ammonium sulfate) are crystallized from solution, while others (ammonium nitrate, urea) are prilled from their melt. Crystallized fertilizers either do not melt or have impractical high melting temperatures. Co-crystallization of fertilizers will only work in instances where a compound is formed, otherwise, the least soluble fertilizer will crystallize and the other component will be rejected to the mother liquor as an impurity.

In order to avoid an added agglomeration step, several approaches to produce a mixed fertilizer via prilling have been developed. The advantages of prilling are well known in the art, and include: high percentage of desired product size and thus little recycle, reduced moisture content leading to reduced drying, and excellent sphericity. One approach to producing a mixed fertilizer via prilling is to add a fully soluble component into a fertilizer melt, such as taught in U.S. Pat. No. 3,820,971. This patent restricts the maximum addition of potassium metaphosphate to an ammonium nitrate melt to a soluble quantity in order to permit prilling by standard means. Another approach to producing a mixed fertilizer via prilling is to mix a generally non-melting fertilizer into a fertilizer melt which may be successful if the slurry is made with a low amount of finely ground solids, since the flow characteristics will be nearly identical to a neat fertilizer melt. Therefore, such a melt slurry can be prilled with well-established techniques. However, if a greater amount of non-melting material is desired, then it may become difficult to have the resulting thick mixture flow through conventional prilling systems.

Different approaches have been taken to solve this problem of a thick mixture resulting from a high concentration of a non-melting component in a melt. In some systems of components, there are limited chemical interactions among the components. Double salts, solubility, and freezing point depression are possible results from limited chemical interactions. For instance, U.S. Pat. No. 3,785,796 discloses that the limited solubility of ammonium sulfate in a urea melt resulted in an unexpectedly fluid mixture which could be prilled with a standard rotating bucket prill head, even at ammonium sulfate loadings as high as 70%.

However, in many other systems of components there are chemical interactions that complicate the prilling process. Various methods have been devised to manage these complications by minimizing reaction time. GB 1,481,038 teaches a simple concept of severely limiting the processing time (the period between the time the melt is fed into the mixer to the time the drops are discharged from the prilling apparatus) to 10 seconds or less so that the mixture can be prilled before any detrimental effects develop. U.S. Pat. No. 3,617,235 teaches the use of larger-sized solid particles to slow reaction prior to prilling. U.S. Pat. No. 4,323,386 teaches a method of managing the addition of reagent, delaying full addition of ingredients until just prior to prilling, again to preclude reactions. U.S. Pat. No. 3,856,269 discloses a mixing apparatus to facilitate prilling by providing very rapid but adequate mixing of fertilizer ingredients prior to prilling in a standard perforated spinning bucket.

While effective in the instances cited, limited reaction time methods create disadvantageous restrictions. These methods add cost and complication to the prilling operation by requiring feedstocks with narrow specifications or the expense of engineering some parts or the entirety of the production system to achieve very brief residence times. Another disadvantage of curtailed reaction time is in a situation where a desirable property is created in the reaction of the fertilizer ingredients. The benefit of such a desirable property would be obviated or reduced by curtailing the extent of reaction.

A different approach to prilling high concentrations of a component in a melt slurry is to design prilling equipment that will force the flow of the slurry. Swedish patent 70,119 teaches a vertical screw machine to blend ammonium nitrate melt with ammonium sulfate solid. At the bottom of the screw, the pressure developed by the screw and static head is supplemented by injection behind the spray nozzle. This design is also intended to minimize the reaction time to avoid decomposition. DE 2,355,660 teaches a prill head incorporating a stirrer-impeller mechanical device similar to a centrifugal pump whereby the slurry is introduced at the center and forced under pressure out holes on the circumference of the prilling disk. Disadvantageously, limiting the prill holes to the circumference of the disk reduces production rate; despite being about 600 millimeter (mm) (approximately 2 feet) in diameter, this prill head is reported to produce only 10–12 tons/hour of product. Overall, these mechanical devices involve considerable cost in construction. Furthermore, the abrasive nature of fertilizer slurry will wear the close clearances necessary for efficient pumping, creating a significant maintenance expense.

Mechanical agitation is already in use in mixed fertilizer production. At a minimum, some form of mixing is required to blend the ingredients together and keep the undissolved solids suspended. Previous patents make use or mention the use of agitation. GB 1,481,038 teaches vigorous agitation as an alternative to its use of reaction time control. It states that mixing in excess of six minutes would be required and cites poor mechanical strength and ammonia loss as undesirable outcomes of this method. DE 2,355,660 offers a cylindrical chamber with stirring blades as a comparative. When operated, this configuration resulted in several different problems including: thickening, clogging of the prill holes, nonuniform product, large fraction of reject coarse grains and occasional large agglomerates that did not solidify in the prill tower.

The problem to be solved is to provide a method to prill mixtures which can shear thin without requiring expensive new equipment or additional steps. The invention solves this problem by prilling in which mechanical agitation in the prill head itself reduces the viscosity of the mixture via the mechanism of shear thinning. The thus-thinned mixture can then be prilled in substantially the same manner as pure fertilizers (such as ammonium nitrate and urea). The modified prill head can be readily installed in existing prill towers. Because the agitation is provided in the prill head, no difficulties exist with thickening from chemical reactions, and thus no extensive re-engineering is required to severely limit residence time. Indeed, sufficient residence time can be readily employed in the overall system to achieve desired chemical reactions. Since the prill head agitator need only mix and shear the melt slurry mixture, and not force it through the prill head holes, no close clearances are required in the prill head nor does the structure and motor of the prill head agitator need to be sized to develop pressure in the system. As one example, ammonium sulfate nitrate (ASN) has been successfully prilled using a vertical, agitated prill head and using an agitated rotating bucket prill cup. In practice, 200 rpm (revolutions per minute) rotational speed in a vertical prill head or the simple incorporation of a stationary mixing blade inside a rotating bucket prill cup provides sufficient shear to achieve a prillable viscosity for ASN. The present invention should prove equally useful in any mixture that exhibits shear-thinning behavior.

SUMMARY OF THE INVENTION

The present invention is a prilling method to prill a shear-thinnable mixture comprising the steps of: providing a molten first component, mixing at least a second component with the molten first component, reacting the components at a temperature and for a time sufficient to form a shear-thinnable mixture having a viscosity, whereby the viscosity decreases with increased shear rate, mechanically agitating the shear-thinnable mixture by an agitator in a prill head to shear thin the shear-thinnable mixture wherein essentially the entire liquid volume in said prill head is swept by said agitator, and permitting the shear-thinned mixture to flow through holes in the prill head under the influence of a force selected from the group consisting of static pressure and centrifugal force.

In a preferred embodiment, ammonium sulfate is added to an ammonium nitrate melt, the mixture is reacted to form the double salt, ammonium sulfate nitrate, and the resultant shear-thinnable melt slurry is then prilled in the inventive process. The resulting prills have excellent strength, sphericity, and storage properties.

DETAILED DESCRIPTION OF THE PREFERRED EMBODIMENTS

The term "ammonium sulfate nitrate" as used herein refers to a double salt of ammonium sulfate and ammonium nitrate.

The term "prilling" are used herein refers to formation of solid particles in an open tower via solidification as droplets fall from a prill head. Prilling is distinguished from spray drying by its near-complete or complete lack of volatile solvent. A prill head is the apparatus at the top of a prill tower which divides the molten material into the streams from which the prills form.

The term "shear thinning" as used herein refers to the phenomena of decreasing viscosity with increasing shear rate. Not all mixtures exhibit shear thinning and it cannot be predicted which mixtures will and which will not possess this behavior.

The term "shear-thinnable mixture" as used herein refers to an at least two component system in which the first component is or forms a molten melt and having at least a second component which results in a mixture which has high viscosity and demonstrates shear thinning behavior. A "shear-thinnable mixture" may include a melt slurry wherein the molten limited meltability and/or limited solubility mixture contains solid particles.

Figure 1:
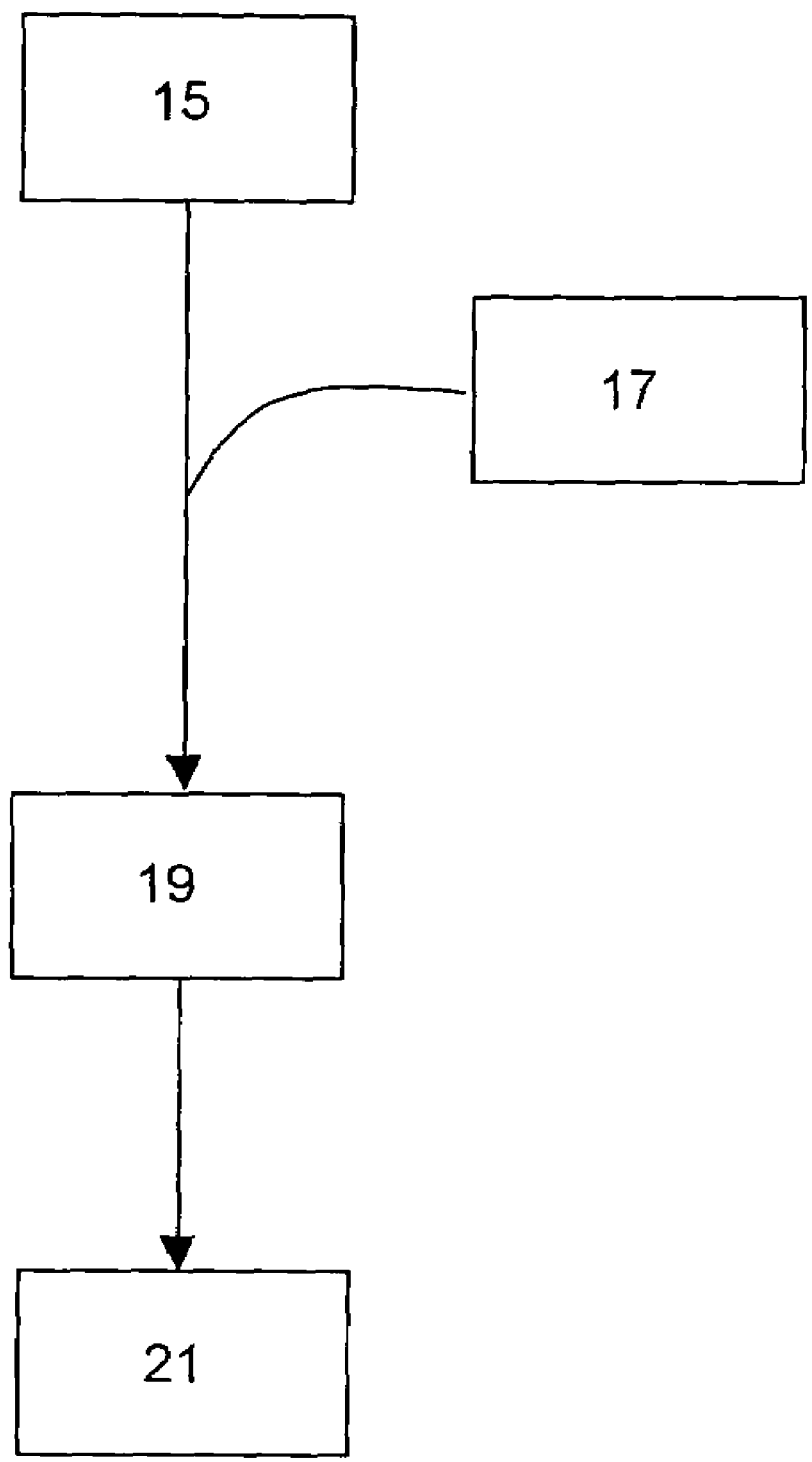
FIG. 1 shows a schematic representation of the inventive method.
Figure 2:
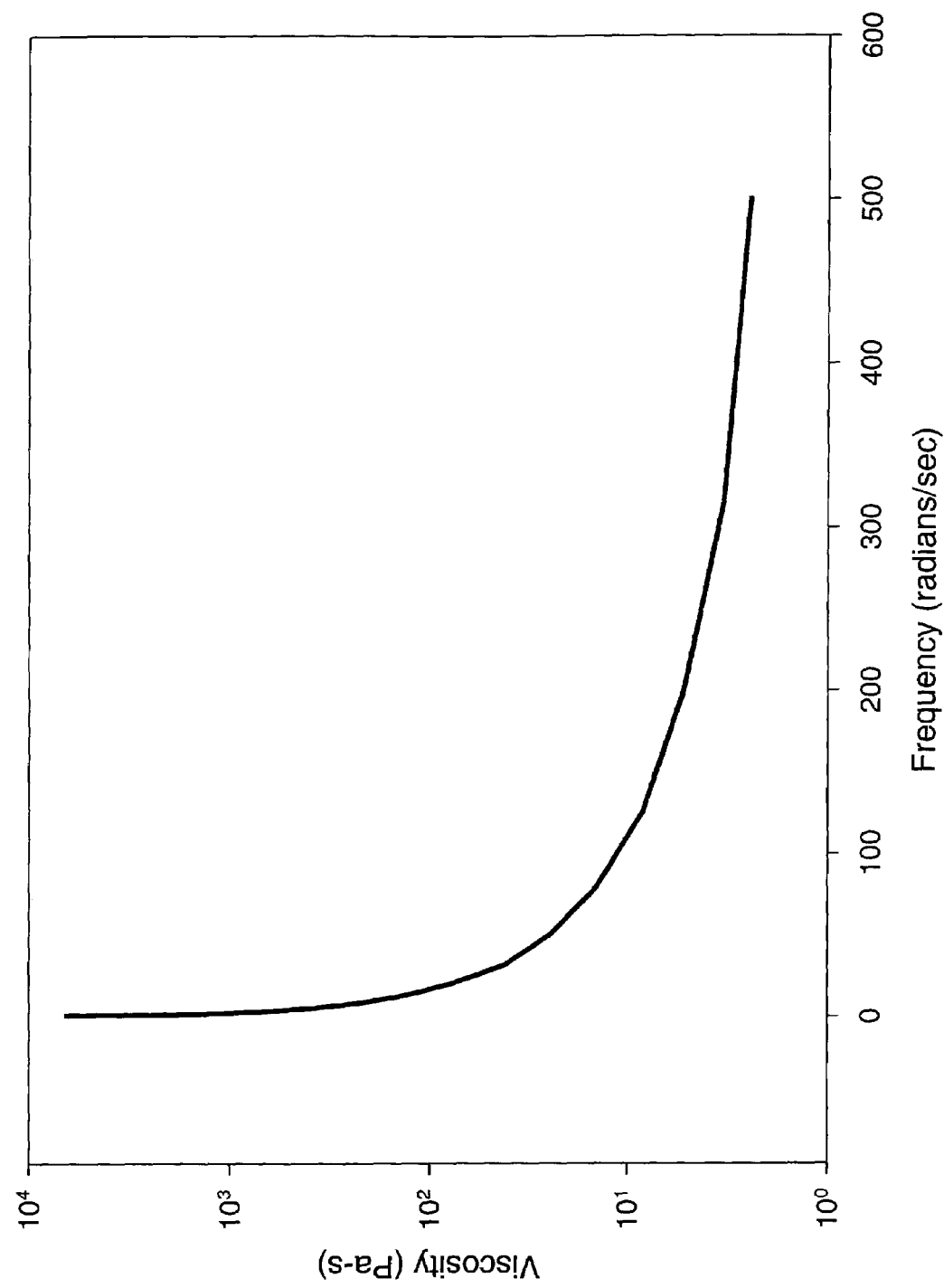
FIG. 2 shows shear thinning behavior of a melt slurry of an equimolar mixture of ammonium nitrate and ammonium sulfate.

As shown in the flow chart of FIG. 1, the invention is a method of prilling a shear-thinnable mixture in which the steps are: providing a molten first component 15, mixing at least a second component 17 into the molten component, reacting the components to produce a shear-thinnable mixture 19, and prilling the shear-thinnable mixture 21 wherein the prilling head apparatus includes mechanical agitation in the prill head to shear thin the shear-thinnable mixture. FIG. 2 shows rheological data for an equimolar ammonium nitrate (AN)/ammonium sulfate (AS) melt slurry. At very low shear frequency, the viscosity of the mixture is extremely high. As the shear frequency increases, there is a dramatic decrease in viscosity. The inventive method adapts the prilling method to take advantage of this shear-thinning phenomena and overcome the problems associated with prilling a viscous solution using known prilling methods.

The key to the invention is the introduction of agitation into the prill head which introduces shear thinning to the high viscosity molten mixture. The shear-thinning agitation reduces the viscosity sufficiently to permit flow through the prill holes to occur as a result of the static pressure due to liquid depth in a stationary prill head, or the centrifugal force developed in a rotating bucket. The degree of agitation necessary for shear thinning in any embodiment of the agitated prill head depends on the shear-thinning behavior of the mixture one wants to prill. The degree of agitation can be readily determined by empirical tests.

Figure 3:
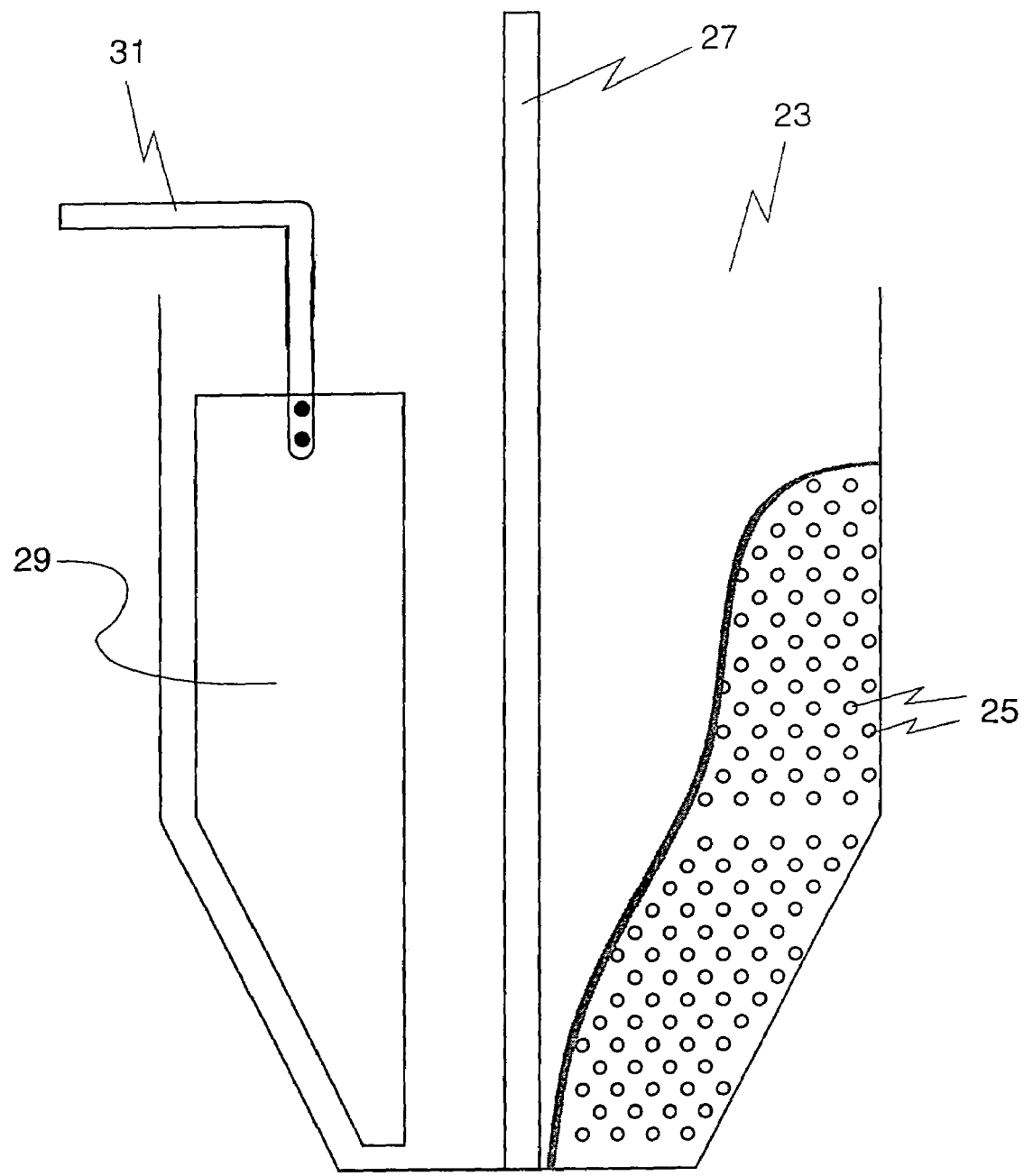
FIG. 3 shows a prill head design useful in the practice of the invention.
Figure 4:
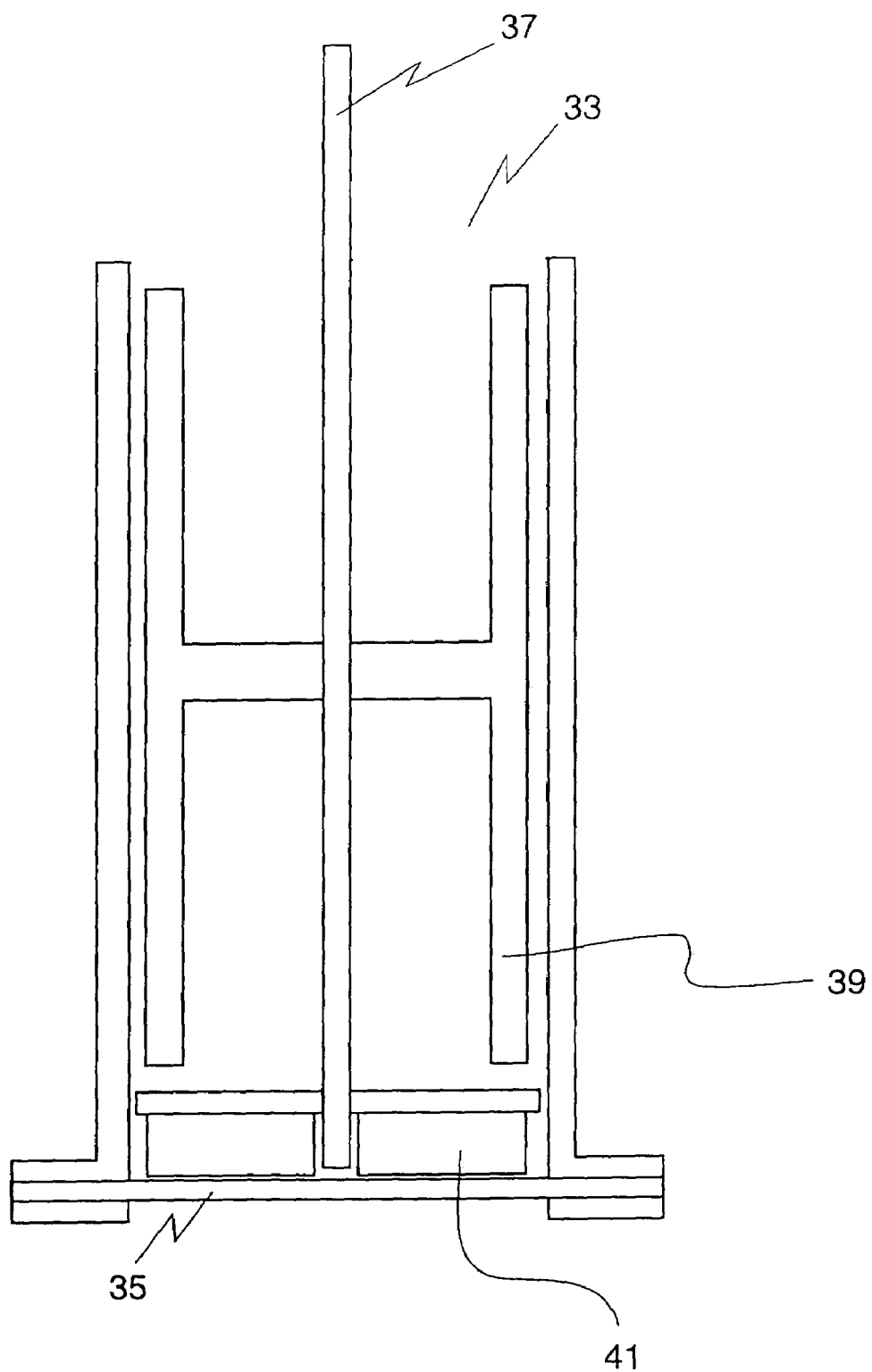
FIG. 4 shows another prill head design useful in the practice of the invention.

Agitation in the prill head can be introduced in a number of ways. Preferred is an agitation device in which essentially the entire liquid volume in the prill head is swept by the agitator. One prill head embodiment is a rotating bucket in which a stationary blade is positioned to introduce shear-thinning agitation. FIG. 3 shows a vertical cross section through the center of an open-topped, rotating bucket prill head 23 which shows in the lower right portion the surface of the rotating bucket with prill holes 25. The rotating bucket 23 is secured and connected to a motor (not shown) by a drive shaft and support mechanism 27. A stationary blade 29 is positioned within the bucket and is secured externally by means of arm 31. A second prill head embodiment is a stationary prill head in which rotating scrappers and blades are incorporated to introduce shear-thinning agitation. FIG. 4 shows a vertical cross section through the center of an open-topped, stationary prill head 33 having a prill plate 35 with prill holes (not shown). Within the prill head 33 is rotatable element 37 which has scrappers 39 and blades 41. If small prills are desired for those markets which prefer them, the use of smaller prill holes in the prill plate 35 require that blades 41 have zero clearance above the plane of the prill plate 35 in order to wipe the plate. Such an embodiment is defined herein as having "surface-wiping blades".

A spray head (a pressurized nozzle assembly) may also be used in the inventive process as long as agitation in the prill head is maintained to produce the necessary shear thinning. To develop pressure, one may close the top of an open vertical prill cup with a cover and shaft seal, an allow the system (pump, head tank, etc.) to build pressure inside the closed, agitated prill head.

In all embodiments of the agitated prill head, the prill holes should be spaced sufficiently apart from each other to preclude the descending streams and/or prills from touching one another and coalescing. Prill hole diameters may be any size commonly practiced in the art. Prill hole diameters of about 2.0 mm to about 4.0 mm are useful in the inventive process and apparatus. Smaller prill hole diameters, of less than 2.0 mm, may be used in an agitated prill head and may utilize surface-wiping blades to wipe the prill plate.

The inventive agitated prill head may be readily incorporated into any known prilling apparatus. Likewise, the inventive method may be used in any known prilling apparatus wherein the prill head has been appropriately modified for agitation. Any known method for transporting the molten shear-thinnable mixture to the prill head for prilling may be used.

Once in the prill head, no extraordinary pressure needs to be developed in the agitated prill head to get the shear-thinned mixture to flow through the holes in the prill head. Advantageously, the inventive method permits the use of static pressure to produce flow through the prill head holes, although the inventive method and apparatus are not limited to the use of static pressure. Static pressure may be developed by maintaining a certain liquid depth in the prill head itself or through the use of a head tank. Most prill systems contain a small tank, the head tank, located above the prill head as an accumulator and feeding device to the prill head. Consistent prill size requires a steady pressure to produce a steady flow out the prill holes. Rather than trying to throttle a pump to maintain steady pressure, it is easier to pump the liquid into the head tank and maintain a fixed liquid depth above the prill head outlet to create static pressure (or "head"). The constant level may be achieved by either placing the head tank on level control (with a drain line back to the source) or providing a fixed overflow line back to the source. Similar mechanisms may be used to maintain liquid depth in the prill head itself. The inventive method and apparatus, however, is not limited to flow in the prill head due to static pressure as a result of liquid depth.

Generally, any mixture of components that yields a shear-thinnable mixture may be used in the inventive method. As the molten first component, ammonium nitrate is most preferred. Other suitable molten first components include: urea and ammonium phosphates. Suitable second components may include any material which results in a viscous and shear-thinnable mixture when added to the molten first component. The second component may or may not be fully meltable and/or soluble in the molten first component. As the second component, ammonium sulfate is most preferred. Useful ammonium sulfate is commercially available from Honeywell International Inc., Hopewell, Va., USA. Other suitable second components include potassium chloride. Other materials can be added to the shear-thinnable mixture if desired as long as they do not adversely affect prilling. For instance, possible third components include micronutrients such as iron sulfate, magnesium sulfate, boron salts, and anti-caking agents.

Generally, mixing time for the mixture may be as long or short as desired for a given mixture, or as necessary to develop beneficial properties. For the mixture of ammonium nitrate and ammonium sulfate, a mixing time of about 10 to 15 minutes is desirable to allow the reaction that yields the double salt to occur. The reaction time in part depends on the size of ammonium sulfate. Addition of larger-sized ammonium sulfate requires a longer mixing time whereas addition of smaller-sized ammonium sulfate requires a lesser amount of mixing time to form the double salt. A finely crushed ammonium sulfate is advantageous because it is easier to handle, provides a quicker reaction time, and provides minimal risk of plugging the prill holes.

Temperature restrictions on the reaction are dictated by the components used. One needs to uses a temperature range in which the first component melts without problems of decomposition or deflagration. When using ammonium nitrate, the minimum temperature is about 180° C. (the melting point of ASN) and a safe maximum reasonable handling temperature about 200° C. Preheating the second component before addition to the molten first component is useful in mixtures where the heat of reaction is important, and is generally desirable due to heat transfer.

Generally, addition of water to a mixture to be prilled is minimized to allow solidification of the prills without the need for removal of excess solvent. The water addition aids melting and suppresses fuming of ammonium nitrate. Addition of water to the molten mixture is preferred to be no more than about 2.0 weight percent (wt %) and is preferably less than or equal to about 1.0 wt % and more preferably less than or equal to about 0.5 wt %. Addition of water from about 2 wt % to about 6 wt % is possible however, it detrimentally impacts prill strength, and requires the prills to be dried.

Stoichiometry limitations on the components of the shear-thinnable mixture are dictated by the specific chemistry of the components. In the examples herein, to produce the double salt, ammonium sulfate nitrate, an equimolar mixture of AN and AS is used. The result is a product in which there is vanishingly little unreacted ammonium nitrate and is a homogeneous mix of the excess, unreacted ammonium sulfate suspended in ammonium sulfate nitrate. Other ratios may be used to produce the double salt.

One of the benefits of the inventive process is that it allows sufficient reaction time to develop advantageous properties in the product. For instance, pure ammonium nitrate prills are problematic for several reasons: 1) storage problems result from its hygroscopic nature; 2) a phase transition at 32° C. can cause the prills to break apart as the temperature fluctuates ("sugaring"); and 3) it is an oxidizer. In contrast, using ammonium nitrate and ammonium sulfate in the inventive process results in a double salt ASN product that has vanishingly little unreacted ammonium nitrate. This product possesses many favorable properties including: 1) reduced hygroscopic problems; 2) no "sugaring"; and 3) ASN is not an oxidizer.

The ASN product of the inventive process used with AN and AS is valuable as a fertilizer by itself. In addition, ASN can be blended with urea to make another fertilizer with a different ratio of fertilizer components. This is an advantage of ASN over pure AN because AN forms a eutectic material when mixed with urea. The resultant ASN prills also have sufficient acidity to be agglomerated using the method according to commonly assigned provisional application Ser. No. 60/119,822, filed Feb. 12, 1999.

Test Methods

Crush strength of the prills was measured by using an Amatek, Inc. Cadet Force Gage to crush granules. The reported crush strengths are averages of several prills.

The viscosity versus shear frequency data was generated using an oscillating disk having a 25 mm diameter and using an 1.8 mm gap. The temperature was 180° C. and a 20% strain amplitude was employed.

EXAMPLES

Comparative Example A

Prilling with Saw Tooth Distributor

It is common for dirty and fouling systems to prill the material using a saw tooth distributor. The open top nature of this device resists pluggage which may result from oversized solids in a melt slurry, and cleaning the saw tooth prilling device is easily accomplished. It was attempted to prill an ammonium sulfate nitrate melt slurry by means of a device designed to simulate a saw tooth distributor. The ASN melt slurry was prepared using 332.3 grams (g) of AS, 159.7 g of AN, and 8.0 g of water. The melt slurry was then transferred manually into a 3.5 inch (in) diameter, 6 in tall stainless steel container having a notch pouring spout equipped with a rod (⅛ inch diameter and 2.75 in long) to smooth and organize the flow in order to produce a stream. The container was then tipped to induce flow out of the notch and down the rod. However, due to the high viscosity, the ASN melt slurry did not flow smoothly down the rod to form a stream. Rather, the ASN exited the container in large, cohesive lumps. Thus, no prills could be obtained using a saw tooth distributor as the high viscosity of the melt slurry precluded a smooth flow.

Comparative Example B

Prilling with Pressurized Spray Head

To test the possibility of prilling the highly viscous ASN melt slurry using a pressurized spray head, a 2⅝ in diameter, 10.5 in long chamber with a removable prill plate at one end and a hose connection for compressed air at the opposite end was prepared. The ASN melt slurry was prepared from 407.6 g AS, 188.6 g AN and 3.8 g water. The pressurized spray head was preheated to 190° C. The melt slurry was loaded into the device, the air hose was attached and pressurized to cause flow through the prill plate. The prill plate had four-2.0 mm diameter prill holes. The spray head was then pressurized to 20 psig (pounds per square inch gauge) with air, and flow was observed out of the holes. However, at this relatively high pressure, the flow tended to spray out the holes, resulting in poor size prills and an unacceptably low crush strength of 1.38 pounds of force (lb-f).

Attempts to prill using prill plates with smaller hole sizes in the pressurized spray head (hole diameter of 1.0 mm and 1.5 mm) and with higher pressure (up to 120 psig) were also unsuccessful. Results were uniformly unacceptable.

Inventive Example One

Prilling with Rotating Bucket with a Stationary Blade

Six hundred grams of ASN was prepared by melting 228 g of ammonium nitrate and adding 372 g of finely ground ammonium sulfate heated to approximately 190° C. (1:1 molar ratio). Ammonium sulfate from AlliedSignal Inc. was used. No water was added to the mixture. The resulting mixture was mixed with heating until a temperature of 207° C. was reached and the melt slurry was fully mixed and fluid. The melt slurry was then poured manually into a rotating bucket prill head, 3.5 inch (89 mm) diameter by 6.0 inch (152 mm) high, equipped with four-2.5 mm diameter prill holes. The bucket was then spun around its central axis to a nominal speed of 500 rpm and a stationary agitator blade was inserted into the melt in the prill head (as illustrated in FIG. 3). After a few seconds of rotation, a stream of melt slurry flowed from the holes due to centrifugal force, and prills were formed. The prills fell about 35 vertical feet and were collected for analysis. A good quantity of well-formed prills were collected with a low moisture content of about 0.05 wt % and an average crush strength of 7.62 lb-f.

Inventive Example Two

Vertical Prilling with Stationary Prill Head Having Rotating Blades and Scrappers Eighty pounds (36.3 kilograms) of ammonium sulfate nitrate was prepared by melting 30.4 pounds (13.8 kilograms) of ammonium nitrate and mixing in 49.6 pounds (22.5 kilograms) of finely ground (Tyler −40), heated ammonium sulfate. The AS was heated using a fluidized bed heater, set to 150° C. Ammonium sulfate from AlliedSignal Inc. was used. A small quantity of water (1.1 pounds; 500 grams) was added to help suppress fuming. The melt slurry was mixed and reacted for several minutes and heated to 181° C. An open top vertical prill head (as pictured in FIG. 4) of 6-inch (152 mm) inside diameter and 16.5-inch (419 mm) liquid depth was equipped with a prill plate of ten-2.5 mm diameter holes. The prill head was a jacketed vessel and had rotating blades to produce agitation. The prill head agitator was brought to a rotation speed of 200 rpm and the ASN melt slurry was pumped from the reactor directly into the top opening of the prill cup. The melt slurry then flowed under its own static pressure through all ten prill holes at a combined rate of 354 pounds per hour (167 kilograms per hour). Ten smooth, well-formed streams of melt slurry were observed.

Comparative Example C

Prilling Using Smaller Prill Holes

A 4-in diameter prill cup of the type pictured in FIG. 4 was fitted with two-1.5 mm diameter prill holes and the agitator blades were situated such that there was a small clearance above the inside of the prill plate. 600 g of AS, ground to a Tyler −48 size was heated to 190° C. and was mixed with 167.7 g of molten AN. The mixture was allowed to react for 30 minutes and was then transferred into the prill cup, which was preheated to 200° C. With the agitator operating at 600 rpm, the prill cup was closed and pressure applied with nitrogen to attempt to induce flow out of the holes. However, no flow could be achieved, even at pressures up to 50 psi.

Inventive Example Three

Prilling Using Smaller Prill Holes and Wiped-Plate Agitator

Using the same prill cup that was used in Comparative Example C, the agitator was reset to provide zero clearance between the bottom blades and the inside plane of the prill plate. The ASN was prepared as in Comparative Example C and transferred into the modified prill cup. With the wiped prill plate, the ASN melt slurry flowed out the prill holes under its own static pressure (approximately 5 in liquid depth), forming smooth streams. The application of nitrogen pressure up to about 2 psi was found to increase the flow rate. At pressures above 2 psi, the streams ceases to flow smoothly and atomization began, resulting in much smaller and irregular particles.

What is claimed is:

1. A method to prill a shear-thinnable mixture comprising the steps of:
    a) providing a molten first component;
    b) mixing at least a second component with said molten first component;
    c) reacting said components at a temperature and for a time sufficient to form a shear-thinnable mixture having a viscosity, which decreases with increasing shear rate;
    d) mechanically agitating said shear-thinnable mixture by an agitator in a prill head under conditions such that the entire liquid volume in said prill head is swept by said agitator to shear thin said shear-thinnable mixture; and permitting said shear-thinned mixture to flow through holes in said prill head under the influence of a force selected from the group consisting of static pressure and centrifugal force.

2. The method according to claim 1 wherein said shear-thinnable mixture is a melt slurry.

3. The method according to claim 1 wherein said first component is ammonium nitrate and said second component is ammonium sulfate.

4. The method according to claim 3 wherein said shear-thinnable mixture further comprises micronutrients.

5. The method according to claim 1 wherein said shear-thinnable mixture comprises no more than about 2 weight percent water.

6. The method according to claim 1 wherein said prill head is one of a rotating bucket with a stationary blade, a stationary bucket with rotating scrappers and blades, and an agitated pressurized nozzle assembly.

7. The method according to claim 1 wherein said prill head is wiped with surface-wiping blades.

8. The method according to claim 7 wherein said first component is ammonium nitrate and said second component is ammonium sulfate.

9. The prilling method according to either claim 3 or claim 8, wherein the reaction time is about 10 minutes to about 15 minutes.

10. The prilling method according to either claim 3 or claim 8, wherein the reaction temperature is at least about 180° C. to about 200° C.

11. The prilling method according to either claim 3 or claim 8, wherein the ammonium nitrate and the ammonium sulfate are present in equimolar amounts.

12. The method according to claim 7 wherein said shear-thinnable mixture comprises no more than about 2 weight percent water.

13. The method according to claim 7 wherein said shear-thinnable mixture further comprises micronutrients.

* * * * *